Figure 1:
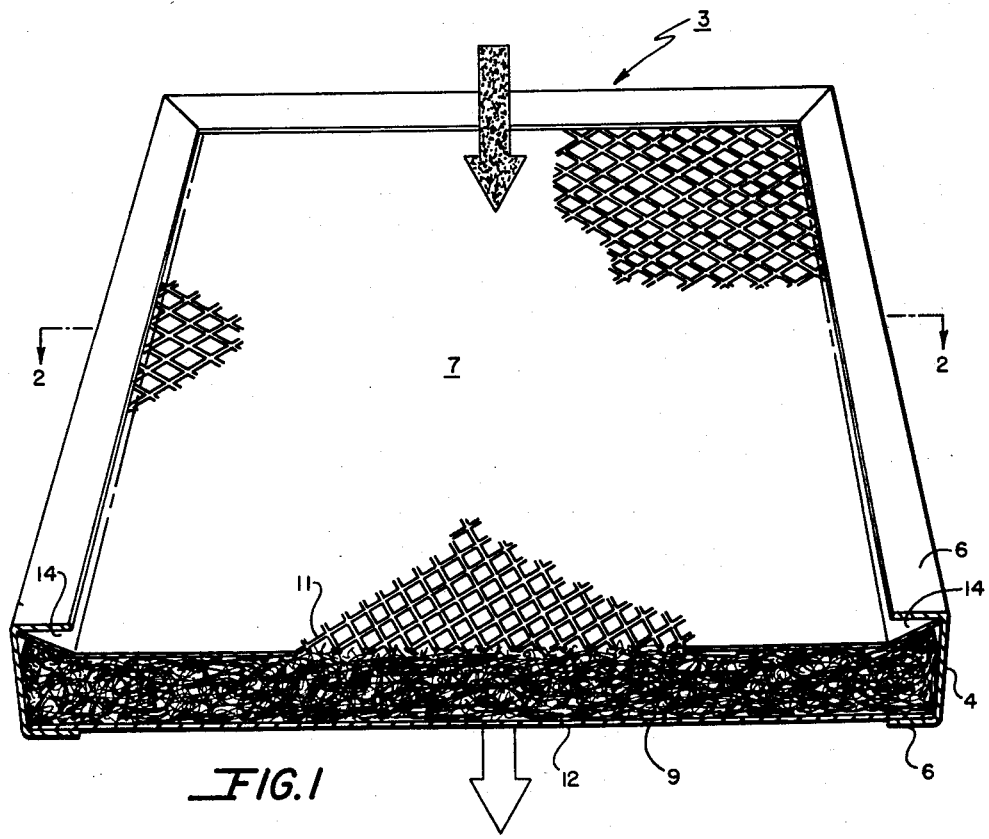

Jan. 29, 1963   A. NUTTING   3,075,334
UNIT FILTER ASSEMBLY
Filed Dec. 18, 1959

INVENTOR.
ARTHUR NUTTING
BY
Ralph B. Brick
ATTORNEY

United States Patent Office 3,075,334
Patented Jan. 29, 1963

3,075,334
UNIT FILTER ASSEMBLY
Arthur Nutting, Louisville, Ky., assignor to American Air Filter Company, Inc., Louisville, Ky., a corporation of Delaware
Filed Dec. 18, 1959, Ser. No. 860,441
5 Claims. (Cl. 55—357)

The present invention relates to a filter assembly and more particularly to an improved arrangement for a filter assembly of the unit type which includes an open face border frame member with a filter medium disposed therein.

In accordance with the features of the present invention, a novel means is provided for securing a filter medium in a border frame member in an economical manner with a minimum of operational steps and without special tools. Further, the resulting unit assembly can be handled readily by consumers without necessitating heretofore known costly and cumbersome gripping devices such as bails or handles which were attached somewhere along the outside face of the border frame member.

Various other features of the present invention will become obvious to one skilled in the art upon reading the disclosure set forth hereinafter.

More particularly, the present invention provides a filter assembly comprising a border frame means defining an open upstream and downstream face to permit fluid flow therethrough, the border frame means including base and sidewall members arranged so that the inner face thereof define a continuous channel, filter medium means disposed transverse the direciton of fluid flow between the upstream and downstream faces of the border frame means, the edges of the filter medium means engaging in the continuous channel of the border frame means, and means to maintain the filter medium edges in spaced relationship from the inner face of the channel to provide a finger grip space between the channel and the filter medium means.

It is to be understood that various changes can be made by one skilled in the art in the arrangement, form and construction of the apparatus disclosed herein without departing from the scope or spirit of the present invention.

Figure 2:
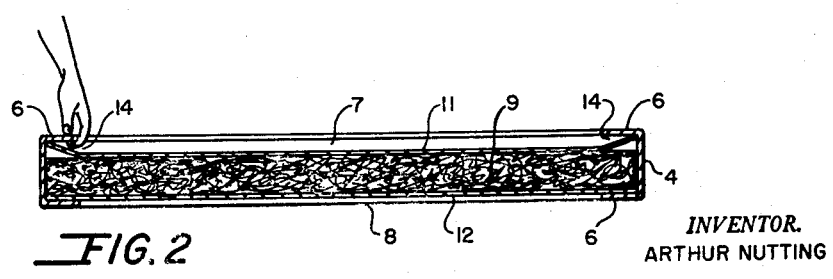

Referring to the drawings which disclose one advantageous embodiment of the present invention:

FIGURE 1 is a plan perspective view of a filter assembly which incorporates the features of the present invention, one side of the assembly being broken away for purposes of illustration; and, FIGURE 2 is a reduced cross-sectional view of the assembly of FIGURE 1 taken in a plane passing through line 2—2 of FIGURE 1, further disclosing the facility with which the novel filter assembly can be handled.

As can be seen in the drawings, the filter assembly broadly designated by reference numeral 3, includes a border frame having base wall member 4 and spaced side wall members 6 extending substantially at right angles from such base wall member. The border frame, which can be fabricated from any suitable sturdy material such as metal or cardboard, serves to define an open upstream face 7 and downstream face 8 to permit fluid flow therethrough with the wall members 4 and 6 of the border frame being disposed so that the inner faces thereof define a continuous U-shaped channel which surrounds the path of fluid flow. Although the border frame in the illustrated embodiment is of rectangular contour, it is to be understood that the features of the present invention can be incorporated in assemblies wherein the border frames are of other contours if the occasion so warrants.

Disposed transverse the direction of fluid flow between upstream face 7 and downstream face 8 of the border frame is a flat filter medium pad 9. The material from which filter pad 9 is formed can be selected in accordance with the particular results desired and can be any one of several known types of material available in the filtering art, for example, filamentous glass fiber mat, animal hair, or intermeshed metallic strands. Pad 9 is contoured to conform with the contour of the border frame so that the edges of the pad engage in the continuous U-shaped channel of the border frame and so that there is a clearance between the face of the pad and the inner face of side wall members 6.

Engaging against the opposite faces of pad 9 are a pair of spaced retainer sheets 11 and 12. These retainer sheets, which can be formed from any sturdy low flow resistant, fluid pervious material—for example, expanded metal—are also contoured to conform with the border frame with the edges thereof engaging in the continuous U-shaped channel of such border frame. It is to be noted that at least one of the sheets, sheet 11 in the disclosed embodiment, has its edge portions offset, as at 14, from the plane determining the intermediate portion of the sheet which engages against the face of pad 9. As can be seen readily in the drawing, edge portions 14 engage along the corners of the U-shaped channel of the border frame to form a grip space between the channel and the retainer sheet. Advantageously, the amount of offset of edge portions 14 should be sufficient to permit insertion of human fingers into such grip space. Thus, not only is a unit filter assembly provided which can be constructed in an economical and efficient manner but, in addition, the resulting unit assembly can be handled readily by a consumer without necessitating costly and cumbersome gripping devices such as bails or handles.

It is to be understood that the present invention is not limited to having only one retainer sheet of a pair with offset edge portions to provide a grip space or to an arrangement wherein the upstream retainer sheet is the one selected to be contoured with offset edge portions.

The invention claimed is:

1. A unit filter assembly comprising a border frame means defining an open upstream and downstream face to permit fluid flow therethrough, said border frame means including base and side wall members arranged so that the inner faces thereof define a continuous channel, filter medium means disposed transverse the direction of fluid flow between said upstream and downstream faces of said border frame means, the edges of said filter medium means engaging in the continuous channel of said border frame means, and spacer means between the inner face of a side wall of said channel and an opposed face of said filter medium edges to maintain said filter medium edges in spaced relationship from said inner face of said side wall of said channel a distance greater than finger-tip thickness to provide a finger-grip space between said channel and said filter medium means.

2. A unit filter assembly comprising a border frame means defining an open upstream and downstream face to permit fluid flow therethrough, said border frame means including base and side wall members arranged so that the inner faces thereof define a continuous channel, filter medium means disposed transverse the direction of fluid flow between said upstream and downstream faces of said border frame means, the edges of said filter medium means engaging in the continuous channel of said border frame means, and retainer and spacer means between the inner face of a side wall of said channel and an opposed face of said filter medium edges to retain said filter medium means in position in said border frame means with the edges thereof in spaced relationship from said inner face of said side wall of said channel a distance greater than finger-tip thickness to provide a finger-grip space between said channel and said filter medium means.

3. A unit filter assembly comprising a border frame defining an open upstream and downstream face to permit fluid flow therethrough, said border frame including base and side wall members arranged so that the inner faces thereof define a continuous channel, a filter medium disposed transverse the direction of fluid flow between said upstream and downstream faces of said border frame, the edges of said filter medium engaging in the continuous channel of said border frame, and a filter medium retainer and spacer having an intermediate portion engaging against a face of said filter medium and edge portions offset from the plane determining said intermediate portion with the extremities engaging against a wall of said channel to hold said medium in position and form a finger-grip space between said channel and said retainer.

4. A unit filter assembly comprising a border frame defining an open upstream and downstream face to permit fluid flow therethrough, said border frame including base and side wall members arranged so that the inner faces thereof define a continuous channel, a filter medium disposed transverse the direction of fluid flow between said upstream and downstream faces of said border frame, the edges of said filter medium engaging in the continuous channel of said border frame, and a sturdy, pervious filter medium retainer and spacer sheet having an intermediate flat portion engaging against a face of said filter medium and edge portions offset from the plane determining said intermediate portion engaging along the corner of said channel to hold said medium in position and to form a finger-grip space between said channel and said retainer sheet.

5. A unit filter assembly comprising a border frame defining an open upstream and downstream face to permit fluid flow therethrough, said border frame including base and side wall members arranged so that the inner faces thereof define a continuous channel, a flat filter medium pad disposed transverse the direction of fluid flow between said upstream and downstream faces of said border frame, the edges of said filter medium pad engaging in the continuous channel of said border frame, and a pair of sturdy, pervious filter medium retainer sheets, each facing the opposite face of said filter medium pad with the edge portions thereof engaging in the continuous channel of said border frame, at least one of said retainer sheets having edge portions offset from the plane determining its intermediate portion to engage along the corners of said channel and form a finger-grip space between said channel and said retainer sheet.

References Cited in the file of this patent

UNITED STATES PATENTS

| | | |
|---|---|---|
| 1,694,089 | Wright | Dec. 4, 1928 |
| 2,115,946 | Eaton | May 3, 1938 |
| 2,142,064 | Whipple | Dec. 27, 1938 |
| 2,408,158 | Belsher | Sept. 24, 1946 |
| 2,459,802 | Fleisher | Jan. 25, 1949 |
| 2,513,946 | Kliefoth | July 4, 1950 |